United States Patent
Hasberg et al.

(10) Patent No.: US 11,435,757 B2
(45) Date of Patent: Sep. 6, 2022

(54) METHOD FOR VERIFYING A DIGITAL MAP OF A MORE HIGHLY AUTOMATED VEHICLE (HAV), ESPECIALLY OF A HIGHLY AUTOMATED VEHICLE

(71) Applicant: Robert Bosch GmbH, Stuttgart (DE)

(72) Inventors: Carsten Hasberg, Isfeld-Auenstein (DE); Jan-Hendrik Pauls, Grossbottwar (DE)

(73) Assignee: Robert Bosch GmbH, Stuttgart (DE)

( * ) Notice: Subject to any disclaimer, the term of this patent is extended or adjusted under 35 U.S.C. 154(b) by 228 days.

(21) Appl. No.: 16/628,834

(22) PCT Filed: Jun. 4, 2018

(86) PCT No.: PCT/EP2018/064647
§ 371 (c)(1),
(2) Date: Jan. 6, 2020

(87) PCT Pub. No.: WO2019/007606
PCT Pub. Date: Jan. 10, 2019

(65) Prior Publication Data
US 2020/0133304 A1   Apr. 30, 2020

(30) Foreign Application Priority Data
Jul. 7, 2017   (DE) .................... 10 2017 211 607.2

(51) Int. Cl.
G05D 1/02      (2020.01)
G01C 21/32     (2006.01)
G05D 1/00      (2006.01)

(52) U.S. Cl.
CPC .......... *G05D 1/0274* (2013.01); *G01C 21/32* (2013.01); *G05D 1/0088* (2013.01); *G05D 1/0278* (2013.01); *G05D 2201/0213* (2013.01)

(58) Field of Classification Search
CPC ........ G01C 21/32; G01C 21/30; G01C 21/28; G01C 21/3811; G01C 21/3415;
(Continued)

(56) References Cited

U.S. PATENT DOCUMENTS

| 8,781,688 | B2* | 7/2014 | Sandblom | G01S 13/931 |
| | | | | 701/1 |
| 2009/0228204 | A1* | 9/2009 | Zavoli | G01C 21/30 |
| | | | | 701/532 |

(Continued)

FOREIGN PATENT DOCUMENTS

| CN | 105973245 A | 9/2016 |
| CN | 106776996 A | 5/2017 |

(Continued)

OTHER PUBLICATIONS

International Search Report for PCT/EP2018/064647, dated Sep. 3, 2018.

*Primary Examiner* — Alexander G Kalinowski
*Assistant Examiner* — Sanjeev Malhotra
(74) *Attorney, Agent, or Firm* — Norton Rose Fulbright US LLP; Gerard Messina

(57) ABSTRACT

A method and corresponding system and computer program for a highly-automated-vehicle (HAV), the method including: providing a digital-map; determining a present vehicle-position relative to the digital-map; providing at least one setpoint property of at least one feature in an HAV-environment; using at least one sensor to detect at least one actual property of a feature in the HAV-environment based at least in part on the setpoint property; comparing the actual property to the setpoint property and determining at least one difference-value based on the comparison; and verifying the digital-map, the digital-map being classified as not up-to-date if the difference-value reaches/exceeds a specified-threshold-value of a deviation, and being classified as (Continued)

up-to-date if the difference-value remains below the specified-threshold-value of the deviation.

9 Claims, 1 Drawing Sheet

(58) Field of Classification Search
CPC ............ G01C 21/3691; G01C 21/3815; G01S 13/931; G01S 13/865; G01S 13/867; G01S 15/931; G01S 17/931; G01S 19/48; G01S 13/86; G01S 13/89; G01S 17/89; G01S 2013/9316; G06K 9/00798; G06K 9/00791; G06K 9/00818; G08G 1/0012; G08G 1/096775; G08G 1/0129; G08G 1/0141; G08G 1/09626; G08G 1/0967; G08G 1/096725; G08G 1/096741; G08G 1/146; G08G 1/16; G08G 1/164; G08G 1/167; B60W 2556/50; B60W 2552/00; B60W 30/00; B60W 30/06; B60W 30/12; B60W 60/001; G05D 2201/0213; G05D 1/0088; G05D 1/0274; G06F 16/29; B62D 15/0285; G06T 2207/30252; G06T 2207/30256; G06T 7/50; G06T 7/74
USPC .................. 701/1, 409, 439, 461, 532, 538; 455/456.3; 340/870.07
See application file for complete search history.

(56) References Cited

U.S. PATENT DOCUMENTS

| | | | | |
|---|---|---|---|---|
| 2010/0217455 | A1* | 8/2010 | Stahlin | G01C 21/32 701/1 |
| 2012/0271540 | A1* | 10/2012 | Miksa | B60W 30/12 701/409 |
| 2014/0025292 | A1* | 1/2014 | Stahlin | G08G 1/0112 701/461 |
| 2015/0127249 | A1* | 5/2015 | Strau | G08G 1/0112 701/439 |
| 2015/0185036 | A1* | 7/2015 | Braeuchle | G08G 1/0962 701/538 |
| 2017/0052032 | A1* | 2/2017 | Miksa | G01C 21/28 |
| 2017/0225678 | A1* | 8/2017 | Bariant | B60W 30/06 |
| 2017/0227366 | A1* | 8/2017 | Laur | B60W 30/00 |
| 2017/0236419 | A1* | 8/2017 | Grewe | G08G 1/164 340/870.07 |
| 2017/0261325 | A1* | 9/2017 | Schroeder | G01S 19/48 |
| 2017/0305467 | A1* | 10/2017 | Nordbruch | G08G 1/146 |
| 2017/0313306 | A1* | 11/2017 | Nordbruch | G08G 1/143 |
| 2017/0370729 | A1* | 12/2017 | Laur | G01C 21/30 |
| 2017/0370730 | A1* | 12/2017 | Mielenz | G01C 21/28 |
| 2018/0025638 | A1* | 1/2018 | Fulger | G01C 21/3453 455/456.3 |
| 2018/0089518 | A1* | 3/2018 | Yamashita | G08G 1/167 |
| 2018/0202814 | A1* | 7/2018 | Kudrynski | G01C 21/3807 |
| 2019/0095728 | A1* | 3/2019 | Mielenz | G07C 11/00 |
| 2019/0318173 | A1* | 10/2019 | Kristensen | B60W 30/18009 |
| 2020/0098135 | A1* | 3/2020 | Ganjineh | G06T 7/74 |
| 2020/0110422 | A1* | 4/2020 | Takamatsu | B60W 50/14 |
| 2020/0141740 | A1* | 5/2020 | Hamer | G06T 17/05 |
| 2021/0009107 | A1* | 1/2021 | Ries | G01C 21/3691 |
| 2021/0215503 | A1* | 7/2021 | Ries | G01C 21/3844 |

FOREIGN PATENT DOCUMENTS

| | | |
|---|---|---|
| DE | 102004010197 A1 | 9/2005 |
| DE | 102008046683 A1 | 3/2009 |

* cited by examiner

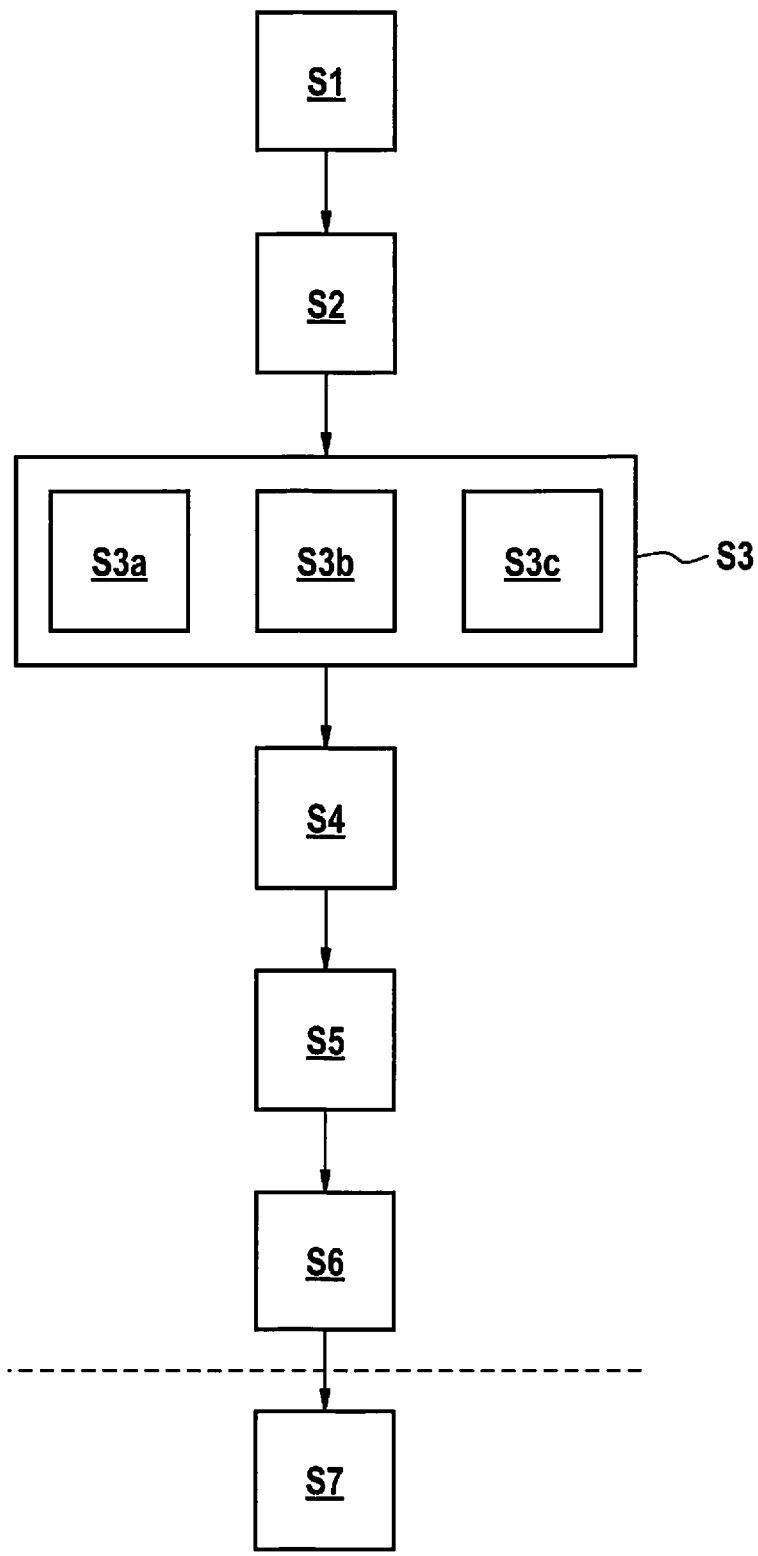

METHOD FOR VERIFYING A DIGITAL MAP OF A MORE HIGHLY AUTOMATED VEHICLE (HAV), ESPECIALLY OF A HIGHLY AUTOMATED VEHICLE

FIELD OF THE INVENTION

The present invention relates to a method for verifying a digital map of a more highly automated vehicle (HAV), especially of a highly automated vehicle, and a driver assistance system for controlling a more highly automated vehicle (HAV), especially a highly automated vehicle.

BACKGROUND INFORMATION

In view of an increase in the degree of vehicle automation, ever more complex driver-assistance systems are being employed. For such driver assistance systems and functions such as highly automated driving or fully automated driving, for instance, a great number of sensors are needed in the vehicle which permit exact sensing of the vehicle environment.

In the following, the term more highly automated is understood to mean all those degrees of automation which, in accordance with the Bundesanstalt für Straßenwesen (BASt) [Federal Highway Research Institute], correspond to automated longitudinal guidance and lateral guidance with increasing system responsibility, e.g., highly automated and fully automated driving.

The related art refers to a variety of possibilities for carrying out a method to operate a highly automated vehicle (HAV). In this context, in order to improve the locating of a highly automated vehicle (HAV) in a digital map, it is necessary to be able to guarantee the accuracy of the digital map, in doing so, the problem arising that short-term route changes caused, e.g., by construction sites, accidents or other circumstances, are not able to be considered or are considered only partially in digital maps, or occur at such short notice that a more highly automated vehicle (HAV), particularly a highly automated vehicle, cannot be provided with these short-term changes quickly enough, and must hand over the control of the vehicle to the driver. This may be undesirable and possibly even critical in terms of traffic safety.

SUMMARY OF THE INVENTION

In order to control the vehicle in a more highly automated manner in as many situations as possible, it is thus necessary to have a digital map as free of errors as possible and corresponding to the reality.

It is therefore an object of the present invention to provide an improved method for verifying a digital map of a more highly automated vehicle (HAV), especially of a highly automated vehicle, and an improved driver assistance system for controlling a more highly automated vehicle (HAV), particularly a highly automated vehicle, with which it is possible to reliably determine how up-to-date a digital map is.

This objective may be achieved with the aid of the subject matter as described herein. Advantageous developments of the invention are the subject matter of the further descriptions herein.

According to one aspect of the invention, a method is provided for verifying a digital map of a more highly automated vehicle (HAV), especially of a highly automated vehicle, including the following steps:

S1 Providing a digital map, which may be a highly accurate digital map, in a driver assistance system of the HAV;

S2 Determining a present vehicle position and locating the vehicle position in the digital map;

S3 Providing at least one setpoint feature property of at least one feature in an environment of the HAV;

S4 Detecting at least one actual feature property of a feature in the environment of the HAV at least in part on the basis of the setpoint feature property, the detection being carried out with the aid of at least one sensor;

S5 Comparing the actual feature property to the setpoint feature property and determining at least one difference value as a result of the comparison; and S6 Verifying the digital map at least in part on the basis of the difference value, the digital map being classified as not up-to-date if the difference value reaches or exceeds a specified threshold value of a deviation, and being classified as up-to-date if the difference value remains below the specified threshold value of the deviation.

By specifying the features and feature properties, the search area of the vehicle sensor system when detecting the features in the vehicle environment may be restricted from the start, which permits a more robust discovery of the features in the environment of the HAV, and thus the detection of the actual feature properties of the features.

By comparing the setpoint feature property to the actual feature property, a difference value corresponding to the match of the feature properties may be ascertained, which is a measure for how up-to-date the map is.

Step (task) S6 includes that the digital map is classified as not up-to-date if the difference value reaches or exceeds a specified threshold value of a deviation, and is classified as up-to-date if the difference value remains below the specified threshold value of the deviation. In this context, for example, the threshold value of the difference value is determined by the nature of the detected feature property, e.g., whether it is a road marking (short-term change is more likely, low error tolerance) or a traffic light (short-term change is rather unlikely, higher error tolerance).

In a further step S7, the method of the present invention may include passing on information regarding the vehicle position and the difference value to a central server.

In the event the map was classified as not up-to-date in step S6, the driver assistance system advantageously requests an update of the digital map from a central server.

In one specific embodiment, the at least one setpoint feature property of the at least one feature is stored in the digital map, which may be a plurality of setpoint feature properties of in turn a plurality of features being stored in the digital map.

For the further procedure, in one specific embodiment of the invention, the step of providing the setpoint feature property (S3) of at least one feature advantageously includes the selection of one of several possible features, the selection being made in consideration of the following steps.

In a step S3a, a feature model is created, the feature model describing with which available sensors and under what conditions, especially at what observation angle and/or at what distance a feature is able to be observed.

In a step S3b, a sensor model is created, the sensor model describing which part of the map the sensors available in each instance are currently able to sense with what specification, especially with what resolution and/or with what noise performance.

In addition, in a step S3c, an environment model is created, the environment model describing whether a feature is currently detectable or is hidden by static or dynamic objects in the environment of the HAV. In the process, information regarding static objects is taken from the digital map, while dynamic objects are ascertained from processed sensor data of the at least one sensor.

In a further specific embodiment of the invention, the method also includes the step that from the feature model, the sensor model and the environment model, an expectation hypothesis is generated for a selected feature, and in step S4, is verified with the aid of the sensor data. It must be regarded as advantageous here that, already before the detection of the feature or the feature property in the environment has begun, the algorithm allows a very precise estimation as to the probability with which the corresponding feature may also be found. Thus, it may be determined in advance, for example, whether detection of the sought feature is even possible, whether perhaps it still lies outside of the sensor range or is hidden by dynamic (e.g., other road users) and/or static objects.

The feature is advantageously a priori information that is contained in the digital map, for instance. Examples for features are a road marking, a reflector post, a guardrail, a traffic light, a traffic sign, a passable area, a traffic density, a 3-D world model and/or a speed profile.

Advantageously, the setpoint feature property as well as the actual feature property are in each case at least one property of the following properties of the feature: geographic position, dimensions, color, location relative to the HAV.

A driver assistance system for controlling a more highly automated vehicle (HAV), especially a highly automated vehicle, forms a further subject matter of the invention. In that context, the driver assistance system includes at least one sensor for sensing an actual feature property of a feature in the environment of the HAV, a storage module for storing a digital map, which may be a highly accurate digital map, a position module for determining a position of the HAV, and a control device. In particular, the storage module is a storage module integrated into the HAV, or is a central server. The position module may be a GPS (Global Positioning System) module. The control device is equipped to exchange data with the storage module and the position module and to locate the vehicle position, determined by the position module, in the digital map. According to the invention, the control device is set up in such a way that it is able to carry out a method described above and claimed in claims 1 through 8.

In addition, a computer program, including program code for carrying out the method as recited in one of claims 1 through 7 when the computer program is executed on a computer, also forms a subject matter of the invention.

Although the present invention is described hereinafter mainly in connection with passenger cars, it is not restricted to them, but rather may be utilized with any type of vehicle, trucks and/or automobiles.

Further features, possibilities of application and advantages of the invention are obtained from the following description of the exemplary embodiments of the invention, which are represented in the figures. In this context, it should be noted that the features represented have only a descriptive character and may also be utilized in combination with features of other developments described above, and are not intended to limit the invention in any way.

The invention is described in greater detail below on the basis of an exemplary embodiment, identical reference numerals being used for identical features.

BRIEF DESCRIPTION OF THE DRAWING

FIG. 1 shows a flowchart of a first specific embodiment of the method according to the present invention.

DETAILED DESCRIPTION

In step S1 of FIG. 1, a digital map, a highly accurate digital map, may be provided, which on the device side, may take place in a storage module for storing the digital map, the storage module in particular being a storage module integrated into the HAV, or being a central server.

Step S2 includes determining a present vehicle position and locating the vehicle position in the digital map, as known sufficiently in the prior art. On the device side, this is accomplished according to the present invention with the aid of a position module, the position module may include a GPS (Global Positioning System) module.

The step denoted in FIG. 1 as S3 includes providing at least one setpoint feature property of at least one feature in an environment of the HAV. Setpoint feature properties of features, e.g., of roadway center markings, are, for example, their geographic position, dimensions, color and their location relative to the HAV. In this context, it is advantageous if the at least one setpoint feature property of at least one feature is stored in the digital map, which may be a plurality of setpoint feature properties of in turn a plurality of features being stored in the digital map.

The method step of the invention denoted by step S4 includes the detection of at least one actual feature property of a feature in the environment of the HAV, at least in part on the basis of the setpoint feature property. Provided for this purpose device-wise is at least one sensor for sensing the actual feature property of the feature in the environment of the HAV, as well as a control device which is equipped, inter alia, to exchange data with the at least one sensor, the storage module and the position module and to locate the vehicle position, determined by the position module, in the digital map. In this context, the sensor is selected from the group of the following sensors: acceleration sensors, camera sensors, radar sensors, lidar sensors.

In this connection, it is advantageous that because the search area is limited by the setpoint feature properties, the sensor system delivers rapid results and functions robustly.

According to the present invention, in step S5, the actual feature properties of features 110 are now compared to the setpoint feature properties of features 120. As a result, step S5 supplies at least one difference value which is used as the basis for a verification of the digital map carried out in step S6. In this connection, the digital map is classified as not up-to-date if the difference value reaches or exceeds a specified threshold value of a deviation, and is classified as up-to-date if the difference value remains below the specified threshold value of the deviation.

In the event the map was classified as not up-to-date in step S6, according to one specific embodiment of the invention, information regarding the vehicle position and the difference value may be passed on to a central server. Likewise, the vehicle assistance system may request an update of the digital map from a central server. One advantageous effect of the invention is that mapping services may use this information as an indicator as to whether it is necessary to remap a certain map section. This permits efficient planning of the costly mapping trips by the mapping service.

In one advantageous development of the invention, step S3 of providing the setpoint feature property of at least one feature includes the selection of at least one of a multitude of possible features, the selection being made in consideration of the following steps:

S3a Creating a feature model, the feature model describing with which available sensors and under what conditions, especially at what observation angle and/or at what distance a feature is able to be observed;

S3b Creating a sensor model, the sensor model describing which part of the map the sensors available in each instance are currently able to sense with what specification, especially with what resolution and/or with what noise performance;

S3c Creating an environment model, the environment model describing whether a feature is currently detectable or is hidden by static or dynamic objects in the environment of the HAV, in the process, information regarding static objects being taken from the digital map, while dynamic objects are ascertained from processed sensor data of the at least one sensor.

Additionally, in one specific embodiment of the invention, the method includes the step that from the feature model, the sensor model and the environment model, an expectation hypothesis is generated for a selected feature, and verified in step S4.

In this way, already before detection of the at least one actual feature property has begun, it may be predicted with high probability whether a detection is to be expected and what type of detection it is.

In one specific embodiment of the invention, a variety of sensors are used to detect the at least one feature property. Accordingly, in this specific embodiment, step S6 of verifying the digital map includes by merging the detection results of the sensors involved in the detection.

The present invention is not limited to the exemplary embodiment described and illustrated. Rather, it also includes all expert further developments within the scope of the invention defined by the patent claims.

Besides the specific embodiments described and illustrated, additional specific embodiments are conceivable which may include further modifications as well as combinations of features.

What is claimed is:

1. A method for a highly automated vehicle (HAV), the method comprising:
   providing a digital map in a driver assistance system of the HAV;
   determining a present vehicle position and locating the vehicle position in the digital map;
   selecting one or more of a predefined plurality of features, wherein the selecting is performed based on:
      a sensor-requirement model that defines for each of the predefined plurality of features, a respective sensor required for detection of the respective feature and a respective type of use of the respective sensor required for the detection of the respective feature;
      a sensor-availability model that indicates, for each of one or more of the respective sensors of the sensor-requirement model, a respective current availability of the respective sensor, which indicates for the respective predefined plurality of features whether the respective sensors identified in the model for the respective features are available for the respective types of uses of the sensors identified in the model for the respective features; and
      an environment model that identifies for each of the predefined plurality of features, whether the feature is expected to be currently blocked from view by one or more static and/or dynamic objects in surroundings of the HAV, wherein the selecting is performed so that the one or more of the predefined plurality of features includes only those respective features of the predefined plurality of features for which both (a) the sensor and type of use defined in the sensor-requirement model for the respective feature are indicated to be available by the sensor-availability model and (b) the environment model does not identify an expectation to be currently blocked;
   based on the selection, selectively for each respective one of the selected one or more of the predefined plurality of features:
      detecting at least one actual feature property of the respective feature in the environment of the HAV using the respective sensor the sensor-requirement model defines for the respective feature according to the respective type of use the sensor-requirement model defines for the respective feature;
      comparing the detected at least one actual feature property of the respective feature to a respective setpoint feature property; and
      determining at least one difference value as a result of the comparison; and
   verifying the digital map at least in part based on the one or more difference values, the digital map being classified as not up-to-date if the one or more difference values reach or exceed respective specified threshold deviation values in which case the driver assistance system requests an update of the digital map from a central server, and being classified as up-to-date if the one or more difference values remain below the respective specified threshold deviation values.

2. The method of claim 1, further comprising:
   passing on information regarding the vehicle position and the difference values to a central server.

3. The method of claim 1, wherein the setpoint feature properties are stored in the digital map.

4. The method of claim 1, wherein a plurality of the sensors are used for the detecting.

5. The method of claim 1, wherein, for the environment model, information regarding the static objects is taken from the digital map, while the dynamic objects are ascertained from processed sensor data of the sensors.

6. The method of claim 1, wherein the plurality of features include at least one of a road marking, a reflector post, a guardrail, a traffic light, a traffic sign, a passable area, a traffic density, a 3-D world model and/or a speed profile.

7. The method of claim 1, wherein the detected at least one actual feature property includes at least one property of the following properties: a geographic position, dimensions, a color, and a location relative to the HAV.

8. A driver assistance system for controlling a highly automated vehicle (HAV), comprising:
   a plurality of sensors;
   a storage module for storing a digital map, the storage module being integrated into the HAV or a central server;
   a position module for determining a present vehicle position of the HAV, the position module including a global positioning system (GPS) module; and
   a control device to exchange data with the storage module, the sensors, and the position module and to locate the vehicle position, determined by the position module, in the digital map;
   wherein the control device is configured for verifying the digital map of the HAV by performing the following:

selecting one or more of a predefined plurality of features, wherein the selecting is performed based on:
  a sensor-requirement model that defines for each of the predefined plurality of features, a respective one of the sensors required for detection of the respective feature and a respective type of use of the respective sensor required for the detection of the respective feature;
  a sensor-availability model that indicates, for each of one or more of the respective sensors of the sensor-requirement model, a respective current availability of the respective sensor, which indicates for the respective predefined plurality of features whether the respective sensors identified in the model for the respective features are available for the respective types of uses of the sensors identified in the model for the respective features; and
  an environment model that identifies for each of the predefined plurality of features, whether the feature is expected to be currently blocked from view by one or more static and/or dynamic objects in surroundings of the HAV, wherein the selecting is performed so that the one or more of the predefined plurality of features includes only those respective features of the predefined plurality of features for which both (a) the sensor and type of use defined in the sensor-requirement model for the respective feature are indicated to be available by the sensor-availability model and (b) the environment model does not identify an expectation to be currently blocked;
based on the selection, selectively for each respective one of the selected one or more of the predefined plurality of features:
  detecting at least one actual feature property of the respective feature in the environment of the HAV using the respective sensor the sensor-requirement model defines for the respective feature according to the respective type of use the sensor-requirement model defines for the respective feature;
  comparing the detected at least one actual feature property of the respective feature to a respective setpoint feature property; and
  determining at least one difference value as a result of the comparison; and
verifying the digital map at least in part based on the one or more difference values, the digital map being classified as not up-to-date if the one or more difference values reach or exceed respective specified threshold deviation values in which case the driver assistance system is configured to request an update of the digital map from the central server, and being classified as up-to-date if the one or more difference values remain below the respective specified threshold deviation values.

9. A non-transitory computer readable medium on which is stored a computer program that includes program code that is is executable by a processor and that, when executed by the processor, causes the processor to perform a method for a highly automated vehicle (HAV), the method comprising:
providing a digital map in a driver assistance system of the HAV;
determining a present vehicle position and locating the vehicle position in the digital map;
selecting one or more of a predefined plurality of features, wherein the selecting is performed based on:
  a sensor-requirement model that defines for each of the predefined plurality of features, a respective sensor required for detection of the respective feature and a respective type of use of the respective sensor required for the detection of the respective feature;
  a sensor-availability model that indicates, for each of one or more of the respective sensors of the sensor-requirement model, a respective current availability of the respective sensor, which indicates for the respective predefined plurality of features whether the respective sensors identified in the model for the respective features are available for the respective types of uses of the sensors identified in the model for the respective features; and
  an environment model that identifies for each of the predefined plurality of features, whether the feature is expected to be currently blocked from view by one or more static and/or dynamic objects in surroundings of the HAV, wherein the selecting is performed so that the one or more of the predefined plurality of features includes only those respective features of the predefined plurality of features for which both (a) the sensor and type of use defined in the sensor-requirement model for the respective feature are indicated to be available by the sensor-availability model and (b) the environment model does not identify an expectation to be currently blocked;
based on the selection, selectively for each respective one of the selected one or more of the predefined plurality of features:
  detecting at least one actual feature property of the respective feature in the environment of the HAV using the respective sensor the sensor-requirement model defines for the respective feature according to the respective type of use the sensor-requirement model defines for the respective feature;
  comparing the detected at least one actual feature property of the respective feature to a respective setpoint feature property; and
  determining at least one difference value as a result of the comparison; and
verifying the digital map at least in part based on the one or more difference values, the digital map being classified as not up-to-date if the one or more difference values reach or exceed respective specified threshold deviation values in which case the driver assistance system requests an update of the digital map from a central server, and being classified as up-to-date if the one or more difference values remain below the respective specified threshold deviation values.

* * * * *